United States Patent [19]

Elger

[11] Patent Number: 4,710,052
[45] Date of Patent: Dec. 1, 1987

[54] LINEAR COUPLING

[76] Inventor: Gerd Elger, Neftenbachstrasse 26, CH-8408 Winterthur, Switzerland

[21] Appl. No.: 810,325
[22] PCT Filed: Mar. 28, 1985
[86] PCT No.: PCT/CH85/00048
 § 371 Date: Nov. 27, 1985
 § 102(e) Date: Nov. 27, 1985
[87] PCT Pub. No.: WO85/04456
 PCT Pub. Date: Oct. 10, 1985

[30] Foreign Application Priority Data

Mar. 28, 1984 [SE] Sweden .................................. 1549/84
Sep. 14, 1984 [SE] Sweden .................................. 4381/84

[51] Int. Cl.⁴ .............................................. F16B 7/18
[52] U.S. Cl. .................................. 403/310; 403/314; 403/341
[58] Field of Search ............. 403/310, 311, 303, 300, 403/314, 341, 305, 333, 339, 360, 371

[56] References Cited

U.S. PATENT DOCUMENTS

| | | | |
|---|---|---|---|
| 1,259,881 | 3/1918 | Lehmann | 403/300 |
| 1,856,917 | 5/1932 | Jordan et al. | 403/341 |
| 1,970,673 | 8/1934 | Rea | 403/305 |
| 2,067,271 | 1/1937 | Johnson et al. | 403/310 |
| 2,305,234 | 12/1942 | Bratz | 403/309 |
| 2,386,473 | 10/1945 | Kanary | 403/310 |
| 3,469,865 | 9/1969 | Ellenburg | 403/300 |
| 4,143,986 | 3/1979 | Antosh | 403/307 |
| 4,408,926 | 10/1983 | Werner | 403/300 |

FOREIGN PATENT DOCUMENTS

| | | |
|---|---|---|
| 2043274 | 3/1972 | Fed. Rep. of Germany . |
| 2249222 | 5/1975 | France . |
| 744030 | 1/1956 | United Kingdom . |

Primary Examiner—Cornelius J. Husar
Assistant Examiner—Peter M. Cuomo
Attorney, Agent, or Firm—Toren, McGeady & Associates

[57] ABSTRACT

A linear coupling device is disclosed for a play-free, safe and dust-protected transmission of large tractive, alternating or radial forces by means of coupling members comprising of fir tree-shaped cones. The coupling members are secured together in combination with corresponding connection members comprising of a plurality of segments and a locking member comprising of a sliding coupling sleeve.

2 Claims, 12 Drawing Figures

LINEAR COUPLING

BACKGROUND OF THE INVENTION

The invention is directed to a linear coupling for transmission of large tractive and alternating forces, as they occur in the course of transportation and assembly of finished concrete parts, in vehicle couplings, during container loading etc.

The presently known couplings for finished concrete parts, as described in CH PS No. 535 180, 562,382 and 620,261 all have the disadvantage that for the coupling operation and locking or unlocking and decoupling, rotational and horizontal movements are required.

Vehicle couplings (trolleys) are known which do not exhibit the above disadvantages and even permit an automatic coupling operation, but are far from being free from play, but for that are large and heavy.

SUMMARY OF THE INVENTION

It is the object of the invention to create a coupling member, which is up to transmitting large tractive- and alternating forces over a long period, free of play with small dimensions in rough operation (construction site, railroad, port), enables an automatic operation, hereby provides a maximum of security and can be rationally manufactured, assembled and replaced. Also in the case of shaft offset with non-aligned parts a coupling engagement should be possible.

The inventive coupling which satisfies these requirements comprises of a pair of coupling members each being formed as a fir tree-shaped cone. The coupling members are secured together in combination with corresponding connection members comprising of a plurality of segments and a locking member comprising of a sliding coupling sleeve.

DESCRIPTION OF THE PREFERRED EMBODIMENTS

In FIG. 1–4, each of the coupling links 11, 12 is connected to a different rod end portion A, B and consist of a fir tree-like, externally wavy cone 11, which is solidly connected with the product to be conveyed, or part B. An identical cone 12 is connected with the crane cable, or part A. The waveform surface 19 is made up of alternating lands 19' and grooves 19".

Figure 1:
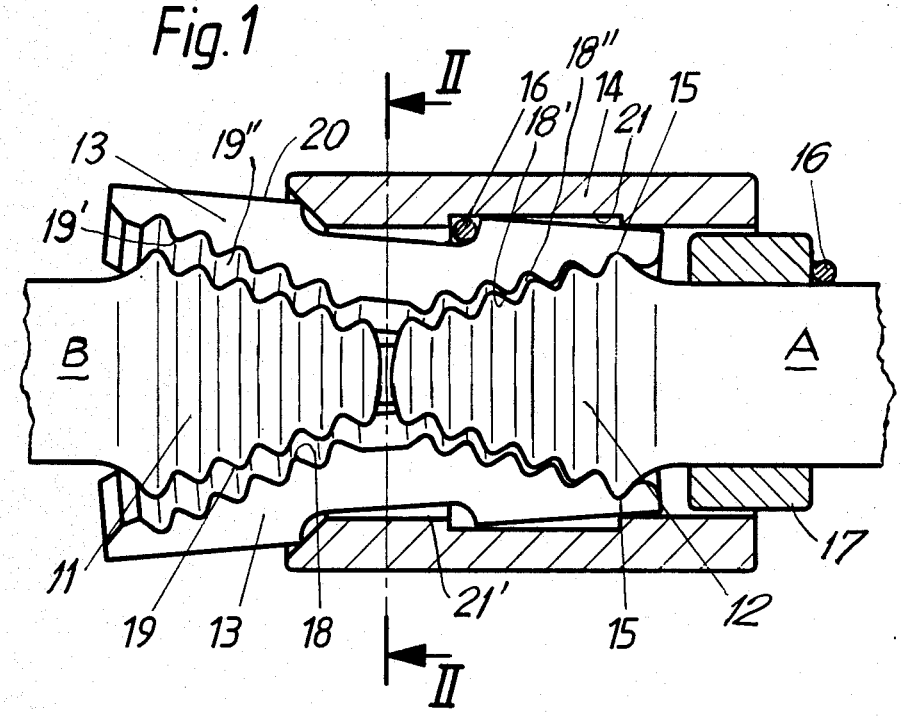
FIG. 1 is an elevation of the coupling in the unlocked state in partial section.
Figure 2:
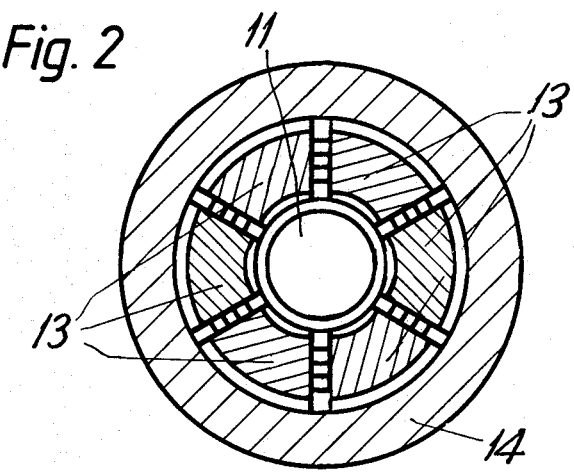
FIG. 2 shows a section along the line II—II of the FIG. 1.

The connecting member 13 consists of six circular segments 13, which can embrace the waveform 19 of fir tree cone 11, 12 with their inside waveform 18 including lands 18' and grooves 18" in a psotively locking manner for coupling end portions A and B together. The sliding box or coupling sleeve 14 on the one hand retains the segments 13 together and causes on the other hand during the locking operation the open sides of the segments 13 to pivot inwardly, whereby the lase waveform 19 or land 19' of the cone 12 serves as a series of fulcrums 15. The outwardly facing surfaces 20 of the segments 13 form a cylindrical outer surface, note FIGS. 2 and 4. Intermediate the ends of the surfaces 20 there is an annular groove 21'. The interior of the coupling sleeve 14 has an annular groove 21". When the coupling sleeve is slid into the locked position, the groove 21" is in register with the groove 21' in the segments 13. In FIG. 1, the annular grooves 21', 21" are spaced apart in the axial direction of the cones 11, 12, that is, in the unlocked position of the coupling. In FIG. 1, the coupling sleeve 14 only partly overlaps the segments 13 while in FIG. 3, in the locked position, the coupling sleeve completely overlaps the segments and the annular grooves 21',21" combine to form an annular groove 21. A bearing ring 17 encircles the part A adjacent the larger end of the cone 12 and in FIG. 1, the coupling sleeve 14 encircles an axially extending part of the bearing ring 7. The stirrup sprint 16 prevents the unintentional locking (FIG. 1) as well as the unintentional unlocking (FIG. 3) of the coupling and thus serves as a safety element. The stirrup spring 16 is a twin U-shaped spring clip with webs spaced apart in the axial direction of the cones 11, 12. The webs extend tranversely of the axial direction. One web of the stirrup spring 16 is located in the recess 21 formed by the combination of the recesses 21', 21". The other web is movable and in the unlocked position is located on the side of the bearing ring 17 more remote from the cone 12, note FIG. 1. When this coupling is locked the web moves into the slot formed between the bearing ring 7 and the adjacent ends of the segments 13, note FIG. 3.

Figure 3:
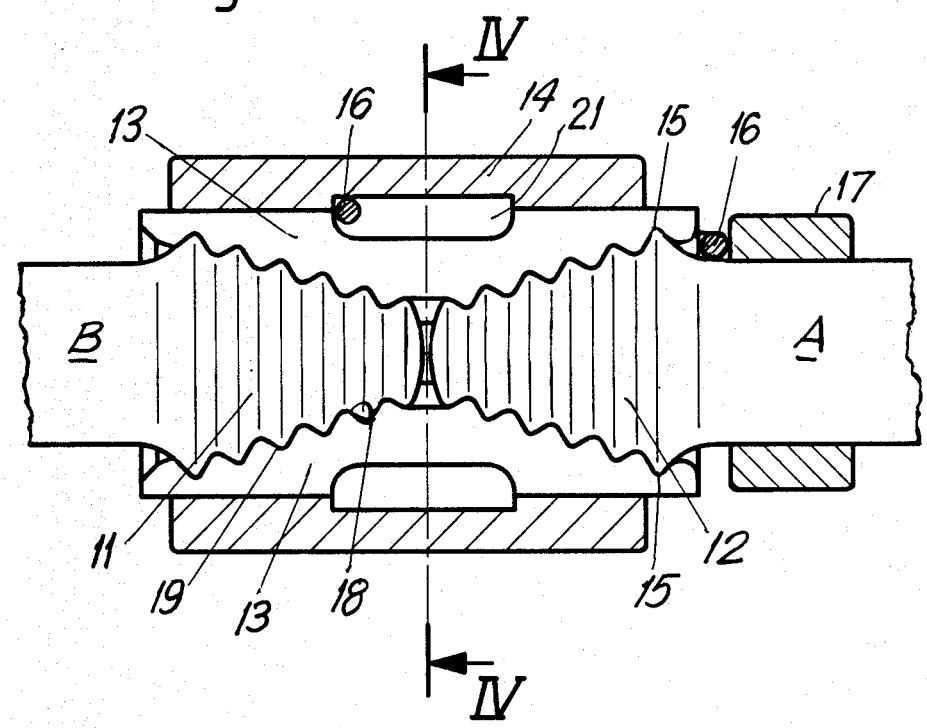
FIG. 3 is an elevation of the coupling in the locked state in partial section.
Figure 4:
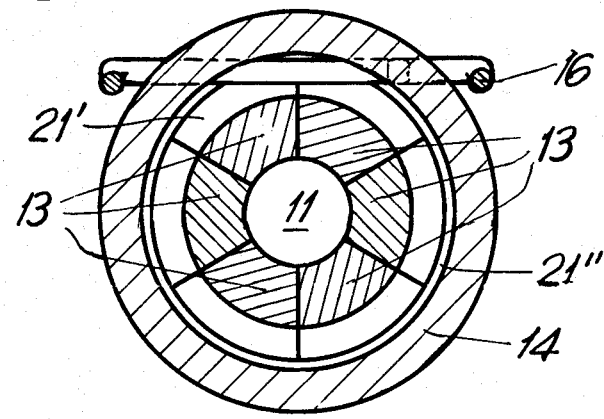
FIG. 4 shows a section through the line IV—IV of the FIG. 3.
Figure 5:
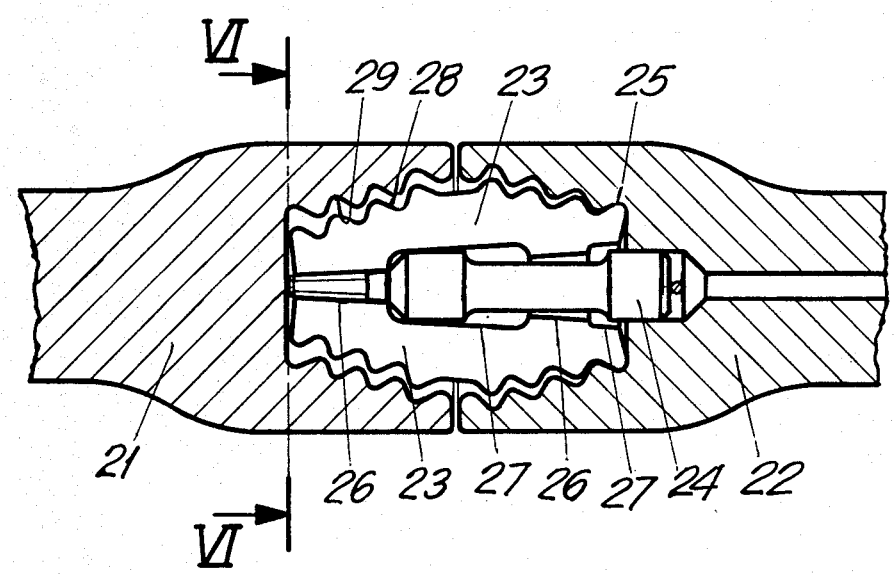
FIG. 5 is a partially sectioned elevation of the slender dust protected coupling without moving external parts in the unlocked state.
Figure 6:
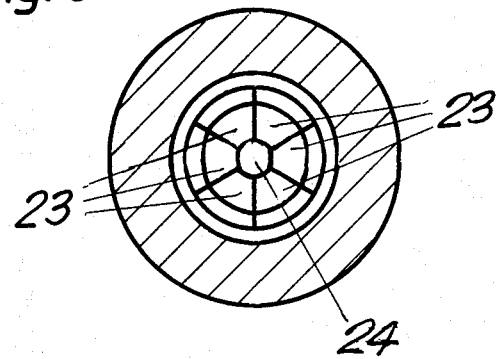
FIG. 6 shows a section along the line VI—VI of the FIG. 5.

If an object to be transported is to be connected with cranes or vehicles in a frictionally locked manner, then the portion of the coupling on the side of the crane is to be moved with opened segments (FIG. 1) over the cone of the part to be connected, until the two cones touch each other; after that the stirrup spring 16 is to be lifted up and the sliding box 14 is to be displaced in the same direction until the stirrup spring 16 again latches (FIG. 3).

For decoupling (in the unloaded state) one proceeds as follows: The stirrup spring 16 is to be lifted up, the sliding box is to be slid backwards until the stirrup spring latches again, the coupling is disengaged.

As long as the coupling is under traction or compression, a decoupling is impossible since the segments are thrust radially against the sliding box 14 proportionally to the load, so that said sliding box is prevented from moving by the increased friction. This is an advantage in view of the increased security, particularly during automatic operationin case of power failure of other malfunctions.

In cases where freedom from play is of particular importance—also after an operation for years with corresponding wear—this requirement can be fulfilled by the following feature:

Sliding box and the segment rim are no longer to be designed cylindrically, rather they should constitute a common cone.

In FIGS. 5–8, a fir tree-like cone 21 with waveforms on the inside is solidly connected with the product to be conveyed. An identical cone 22 is connected with the crane cable. Six segments 23 with outside waves and a common bore 26 are located inside the cones 21 and 22. The actuating cylinder 24 in unblocked position is located in the middle of the bore 26, which entails a centralizing of the segments 23 by means of the recess 27 and thus an unlocking process.

Figure 7:
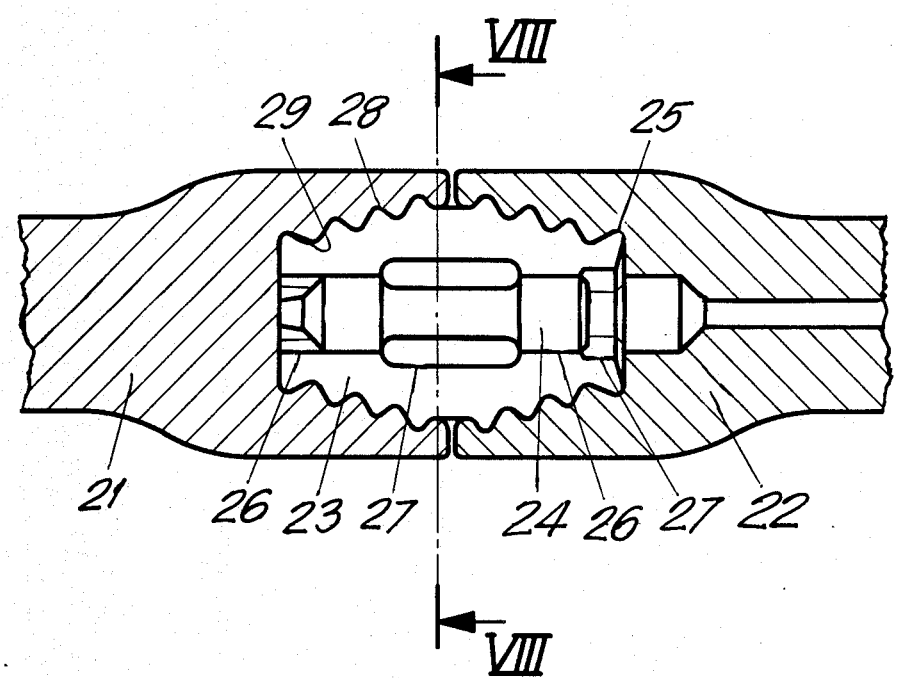
FIG. 7 is a partially sectioned elevation of the slender dust protected coupling without moving outer parts in the locked state.
Figure 8:
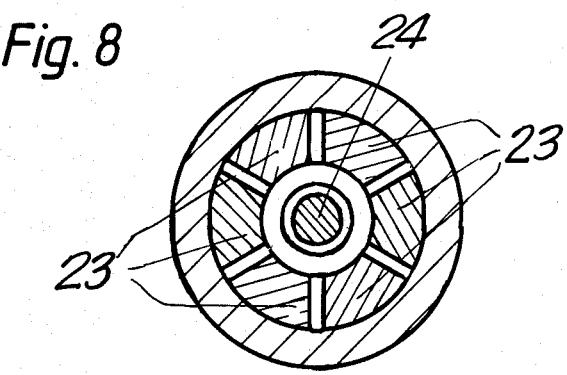
FIG. 8 shows a section along the line VIII—VIII of the FIG. 7.
Figure 9:
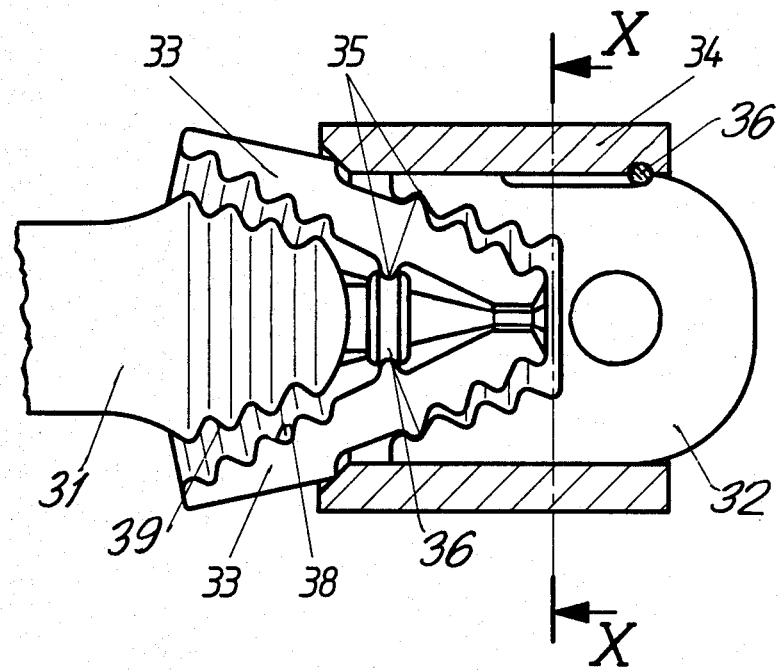
FIG. 9 is a partially sectioned elevation of the short coupling for additional transmittal of large radial forces in the unlocked state.
Figure 10:
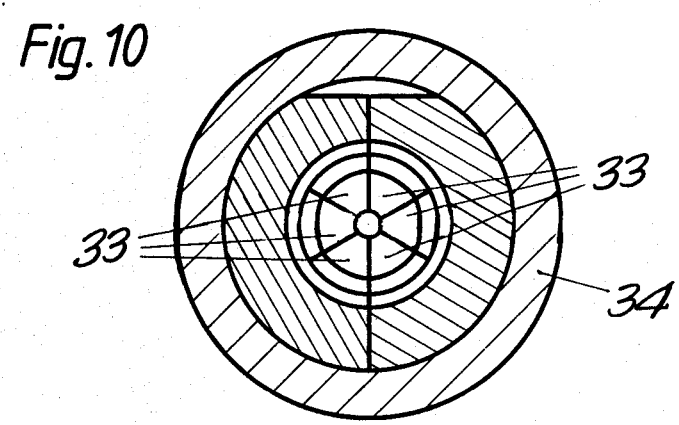
FIG. 10 shows a section along the line X—X of the FIG. 9.

If objects to be transported have to be connected with cranes or vehicles in a frictionally locked manner, then the portion of the coupling on the side of the crane with the centralized segments 23 (FIG. 5) must be driven into the cone 21 of the part of the coupling on the side of the product to be conveyed and the actuating cylinder 24 is to be displaced in the same direction, which causes an expansion of the segment 23 and brings the coupling into a locked state (FIG. 7).

For the uncoupling operation the actuating cylinder 24 must be displaced in opposite direction, so that the segments 23 can centralize themselves thanks to the recess 27, whereby they swing around fulcrums 25. The coupling is disengaged.

In cases where freedom from play is of particular importance, also after an operation for years and corresponding wear, this requirement can be fulfilled by the following features: actuating cylinder 24 and bore 26 must no longer be designed cylindrically, rather they should constitute a common cone.

In FIGS. 9–12, a fir tree-like cone 31 with external waveforms is solidly connected with the product to be conveyed. A cone 32 having corresponding inside waves is connected with the crane cable. Six segments 33 embrace, on the side of the product to be conveyed, the cone 31 and protrude on the side of the crane into the hollow cone 32, whereby they support themselves on fulcrums 35 in the cone 32 and on the flying disk 36. The sliding box 34 on the one hand retains the segments 33 together and causes on the other hand during the locking operation the open sides of the segments to swing inwards and the closed ones outwards. Fulcrums hereby are the flying disk 36 and the foremost groove of the cone 32.

Figure 11:
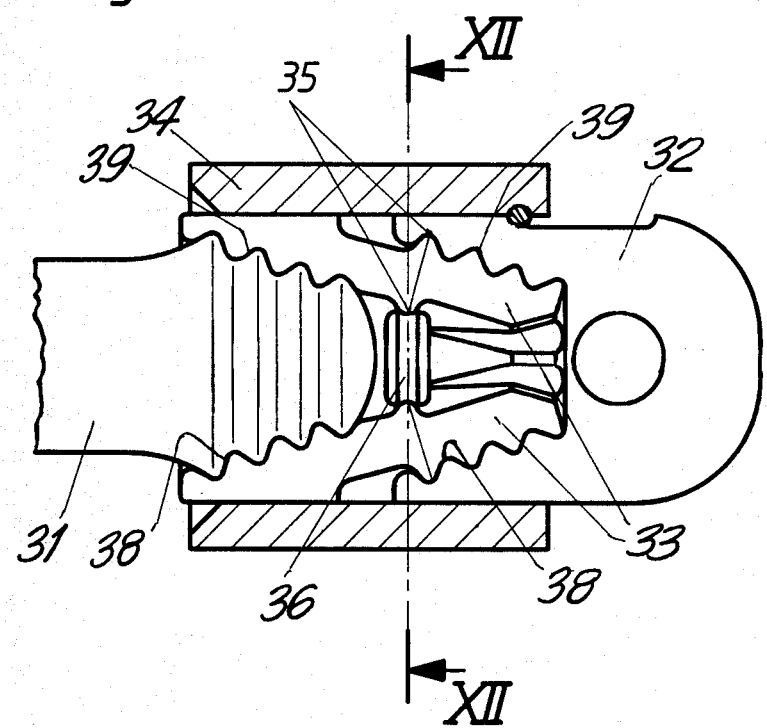
FIG. 11 is a partially sectioned elevation of the short coupling for additional transmittal of large radial forces in the locked state.
Figure 12:
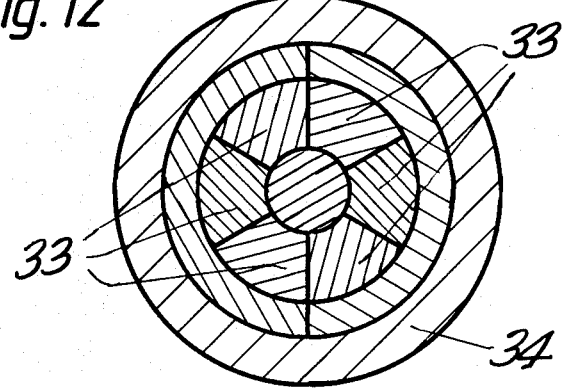
FIG. 12 shows a section along the line XII—XII of the FIG. 11.

For the coupling operation the part of the coupling 32 on the side of the crane with open segments 33 (FIG. 9) is to be driven over the cone of the part to be connected and the sliding box 34 must be displaced in the same direction up to the stop (FIG. 11).

For the decoupling operation the sliding box 34 must be displaced in the opposite direction up to the stop, so that the segments 33 together with their halves comprising waveforms on the outside centralize themselves and with their halves comprising waveforms on the inside expand (FIG. 9), whereby they rotate around fulcrums 35.

In cases where freedom from play is of particular importance-also after operation for years and corresponding wear, this requirement can be fulfilled by the following feature:

Sliding box and segment rim with the part exhibiting waveforms on the inside are no more to be designed cylindrically, rather they should form a common cone.

I claim:

1. Linear coupling for the transmission of large tractive and alternating forces free from play comprises two coupling links and coupling means for interconnecting said coupling links, each said coupling link comprises a rod end portion (A, B) and a truncated cone (11, 12), having a central axis with said cone connected to and extending axially from said end portion, each of said cones (11, 12) being substantially similar and having a conically shaped exterior surface extending in the axial direction with a waveform (19) configuration comprising alternating lands (19') and grooves (19") extending transversely of the axial direction, each said cone (11, 12) having a smaller diameter and a larger diameter and with the larger diameter ends connected to the respective end portions (A, B) and the smaller diameter ends disposed in adjacent facing relation, said coupling means comprises an elongated annular coupling member (13) having an axis extending generally parallel with the axes of said cones formed of a number of elongated circular segments (13), said circular segments (13) having an axial length substantially equal to the combined axial lengths of said cones, said segments having an inner surface (18) and an outer surface (20) extending circumferentially around said cones and a pair of opposite ends extending transversely of the axis of said connecting member, the inner surface (18) of said segments having alternating lands (18') and grooves (18") arranged to interfit with the corresponding said grooves (19") and lands (19') of said cones (11, 12), said inner surface (18) of said segments (13) being conically shaped converging inwardly from each of the opposite ends to approximately mid-way between the opposite ends, the outer surface (20) of said segments forming a cylindrically shaped surface with an annular groove (21') approximately mid-way between the opposite ends thereof, said coupling means also includes an axially extending annular sliding coupling sleeve (14) generally coaxial with and laterally encircling said segments (13), said sliding coupling sleeve (14) having an inner surface and an outer surface with said inner surface being cylindrically shaped and having an annular groove (21") therein corresponding to said annular groove (21') in said segments, said sliding coupling sleeve (14) being axially displaceable between an unlocked position with said annular groove (21") therein out of register with said annular groove (21') in said segments (13) and a locked-position with said annular groove (21") in said sliding coupling sleeve in register with said annular groove (21') in said segments, a bearing ring on one of said end portions (A, B) adjacent to and spaced axially from the larger diameter end of said cone attached to said end portion, and a twin U-shaped spring clip-like stirrup (16) with said stirrup having a pair of webs spaced apart and extending transversely of the axial direction of said sliding coupling sleeve, and legs extending in the axial direction of said sliding coupling sleeve and interconnecting said webs, one of said webs located within said annular grooves (21', 21") in said segments (13) and said sliding coupling sleeve (14) and the other said web arranged in the unlocked position of said sliding coupling sleeve in bearing contact with an end of said bearing ring (17) spaced more remotely from the adjacent said cone and in the locked position being located between said bearing ring (17) and the larger diameter end of the adjacent said cone.

2. Linear coupling, as set forth in claim 1, wherein said lands (18', 19') and said groove (18", 19") of said cones (11, 12) and said segments (13) being rounded.

* * * * *